US012798507B2

(12) United States Patent
Kim et al.

(10) Patent No.: US 12,798,507 B2
(45) Date of Patent: Nov. 17, 2026

(54) CRASH DETECTION CIRCUIT FOR BATTERY MANAGEMENT UNIT

(71) Applicant: SAMSUNG SDI CO., LTD., Yongin-si (KR)

(72) Inventors: Hyun Kim, Suwon-si (KR); Kyo Song Koo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 16 days.

(21) Appl. No.: 18/926,146

(22) Filed: Oct. 24, 2024

(65) Prior Publication Data

US 2025/0136030 A1 May 1, 2025

(30) Foreign Application Priority Data

Oct. 26, 2023 (KR) ........................ 10-2023-0144721

(51) Int. Cl.

| | |
|---|---|
| ***B60R 21/01*** | (2006.01) |
| ***B60R 21/013*** | (2006.01) |
| ***H01M 10/42*** | (2006.01) |
| ***H02J 7/60*** | (2026.01) |

(52) U.S. Cl.

CPC ......... *B60R 21/013* (2013.01); *H01M 10/425* (2013.01); *H02J 7/663* (2026.01); *H01M 2010/4271* (2013.01); *H01M 2220/20* (2013.01)

(58) Field of Classification Search

CPC ..... B60R 21/013; H01M 10/425; H02J 7/663; B60L 58/16; B60L 2240/547

See application file for complete search history.

(56) References Cited

U.S. PATENT DOCUMENTS

| | | | | |
|---|---|---|---|---|
| 11,292,413 | B2 | 4/2022 | Juhl et al. | |
| 2004/0008079 | A1* | 1/2004 | Osamura | G05F 1/575 327/540 |
| 2012/0150393 | A1 | 6/2012 | Knight-Newbury et al. | |
| 2013/0202918 | A1* | 8/2013 | Kimura | H02H 3/207 361/88 |
| 2014/0070772 | A1 | 3/2014 | Andres et al. | |
| 2018/0111572 | A1* | 4/2018 | Hofer | G01D 5/145 |

FOREIGN PATENT DOCUMENTS

| | | | |
|---|---|---|---|
| EP | 3 819 161 | A1 | 5/2018 |
| EP | 3 315 918 | A1 | 5/2021 |
| EP | 3819161 | * | 12/2021 |

OTHER PUBLICATIONS

Extended European Search Report issued in corresponding EP Application No. 24208433.3, dated Mar. 31, 2025, 8 pages.

* cited by examiner

*Primary Examiner* — Jason Holloway
*Assistant Examiner* — Godfrey Aleksander Maciorowski
(74) *Attorney, Agent, or Firm* — Womble Bond Dickinson (US) LLP

(57) ABSTRACT

A crash detection circuit of a battery management unit (BMU), includes a reference voltage generator configured to generate a reference voltage in response to a crash signal output from a vehicle being input to the BMU; and a comparator configured to compare the reference voltage generated from the reference voltage generator with a processed crashed signal corresponding to the crash signal and to output a crash detection signal in response to the processed crash signal having a duration greater than or equal to a minimum retention time and at a voltage greater than or equal to the reference voltage.

14 Claims, 9 Drawing Sheets

FIG.1A

| Time (ms) | Current (A) |
|---|---|
| 0.5 | 1.75 |
| 2 | 0.5 |

CRASH DETECTION CIRCUIT FOR BATTERY MANAGEMENT UNIT

CROSS-REFERENCE TO RELATED APPLICATION

The present application claims priority to and the benefit of Korean Patent Application No. 10-2023-0144721, filed on Oct. 26, 2023, in the Korean Intellectual Property Office, the entire disclosure of which is incorporated herein by reference.

BACKGROUND

1. Field

Aspects of embodiments of the present disclosure relate to a crash detection circuit for a battery management unit.

2. Description of the Related Art

Generally, vehicles should be designed to protect the bodies of passengers from external accidents and secure their safety.

For example, a vehicle detects a crash received from an external object and quickly activates a supplemental restraint system (SRS) (e.g., an air bag) inside the vehicle on the basis of the received crash to protect passengers.

Even in electric vehicles, a crash detection circuit plays a very important role.

For example, when an external crash occurs while a battery pack outputs a high voltage and a high current, casualties may occur due to the high voltage and the high current. In order to prevent the casualties, a crash detection circuit is applied to a battery management unit (BMU) in an electric vehicle, and the crash detection circuit of the BMU detects that a crash occurs in the vehicle on the basis of a crash signal (or crash current) transmitted from the vehicle (e.g., a vehicle electronic control unit (ECU)) to block a battery output (e.g., turns a relay or actuator off to block the battery output).

However, there is a problem in that the BMU detects that a normal crash signal is input and performs an unnecessary crash response operation (e.g., turns the relay or actuator off to block the battery output) even when an abnormal crash signal caused by aging or failure of the vehicle (or vehicle components) is input to the crash detection circuit of the BMU.

The above information disclosed in this Background section is for enhancement of understanding of the background of the present disclosure, and therefore, it may contain information that does not constitute related (or prior) art.

SUMMARY

Aspects of embodiments of the present disclosure are directed to providing a crash detection circuit for a battery management unit (BMU) that excludes an abnormal crash signal transmitted from the vehicle to the BMU and performs a crash response operation for (e.g., only for) a normal crash signal.

Aspects of embodiments of the present disclosure are directed to providing a crash detection circuit of a BMU that allows a crash response operation to be performed only for a crash signal exceeding a preset retention time threshold value and a crash current threshold value in order to exclude an abnormal crash signal transmitted from the vehicle to the BMU.

However, objects that the present disclosure intends to achieve are not limited to the above-described objects and other objects that are not described may be clearly understood by those skilled in the art from the following description.

According to some embodiments of the present disclosure, there is provided a crash detection circuit of a battery management unit (BMU), including: a reference voltage generator configured to generate a reference voltage in response to a crash signal output from a vehicle being input to the BMU; and a comparator configured to compare the reference voltage generated from the reference voltage generator with a processed crashed signal corresponding to the crash signal and to output a crash detection signal in response to the processed crash signal having a duration greater than or equal to a minimum retention time and at a voltage greater than or equal to the reference voltage.

In some embodiments, the processed crash signal compared with the reference voltage by the comparator corresponds to the crash signal, which is amplified through an amplifier.

In some embodiments, the crash detection circuit further includes: an amplifier configured to amplify the crash signal with a set gain by receiving the crash signal from the vehicle and generating an amplified crash signal to the reference voltage generator, wherein the processed crash signal corresponds to the amplified crash signal.

In some embodiments, the reference voltage generator includes a reference voltage generation circuit configured to generate and output the reference voltage in response to the amplified crash signal being output.

In some embodiments, the reference voltage generation circuit includes: a constant voltage source; a switch having one side connected to the constant voltage source and another side connected to a plurality of resistors that are connected in series; and a capacitor having one side connected to a common connection point of the plurality of resistors and another side that is grounded, wherein the reference voltage is output from the common connection point of the plurality of resistors.

In some embodiments, the reference voltage generator further includes a low-pass filter circuit configured to filter the amplified crash signal and to generate and output the processed crash signal.

In some embodiments, the crash detection circuit further includes: a latch configured to latch the crash detection signal output from the comparator, wherein a driving module configured to block an output of a battery is operated by the latched crash detection signal.

According to some embodiments of the present disclosure, there is provided a crash detection circuit of a battery management unit (BMU), including: a reference voltage generator configured to generate a reference voltage in response to a crash signal output from a vehicle being input to the BMU; a maximum voltage limiting circuit configured to limit a maximum voltage of the crash signal output from the vehicle to a set voltage and to generate a capped crash signal; and a comparator configured to compare the reference voltage generated by the reference voltage generator with the capped crash signal output by the maximum voltage limiting circuit, and to output a crash detection signal in response to the capped crash signal having a duration greater than or equal to a minimum retention time and a voltage greater than or equal to the reference voltage.

In some embodiments, a signal input to the maximum voltage limiting circuit corresponds to the crash signal, which is amplified through an amplifier.

In some embodiments, the amplifier is configured to generate an amplified crash signal by amplifying the crash signal received from the vehicle with a set gain, and to output the amplified crash signal to the reference voltage generator.

In some embodiments, the reference voltage generator includes a reference voltage generation circuit configured to generate and output the reference voltage in response to the capped crash signal being output from the maximum voltage limiting circuit.

In some embodiments, the reference voltage generation circuit includes: a first constant voltage source and a second constant voltage source; a switch having one side connected to the first constant voltage source and another side connected to one side of a third resistor; a first diode having an anode connected to the other side of the third resistor and a cathode connected to one side of a fourth resistor; a second diode having an anode connected to the second constant voltage source and a cathode connected to the one side of the fourth resistor; and a capacitor having one side connected to a common connection point of the first and second diodes and the fourth resistor and having another side that is grounded, wherein the reference voltage is output from the common connection point of the first and second diodes and the fourth resistor.

In some embodiments, the reference voltage generator further includes a low-pass filter circuit configured to filter and output the capped crash signal output from the maximum voltage limiting circuit.

In some embodiments, the crash detection circuit further includes: a latch configured to latch the crash detection signal output from the comparator, wherein a driving module configured to block an output of a battery is operated by the latched crash detection signal.

BRIEF DESCRIPTION OF THE DRAWINGS

The following drawings attached to this specification illustrate embodiments of the present disclosure, and further describe aspects and features of the present disclosure together with the detailed description of the present disclosure. Thus, the present disclosure should not be construed as being limited to the drawings:

FIGS. 1A-1B illustrate specifications of a crash signal transmitted from a vehicle to a battery management unit (BMU).

DETAILED DESCRIPTION

Figure 1B:
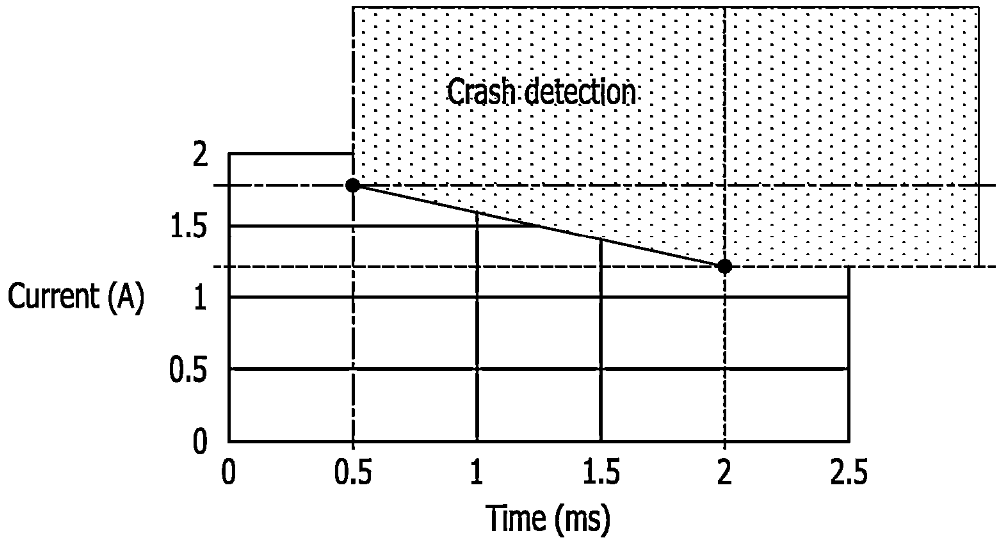

Hereinafter, embodiments of the present disclosure will be described, in detail, with reference to the accompanying drawings. The terms or words used in this specification and claims should not be construed as being limited to the usual or dictionary meaning and should be interpreted as meanings and concepts consistent with the technical idea of the present disclosure based on the principle that the inventor can be his/her own lexicographer to appropriately define the concept of the term to explain his/her invention in the best way.

The embodiments described in this specification and the configurations shown in the drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of" A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

When an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

FIGS. 1A-1B illustrate specifications of a crash signal transmitted from a vehicle to a battery management unit (BMU). FIG. 1A is a table showing times and current values of a crash signal. FIG. 1B is a graph showing the times and the current values of the crash signal.

A crash detection area, shown in FIG. 1B as a hatched area, represents a minimum time and current specifications for detecting the crash signal.

Figure 2A:
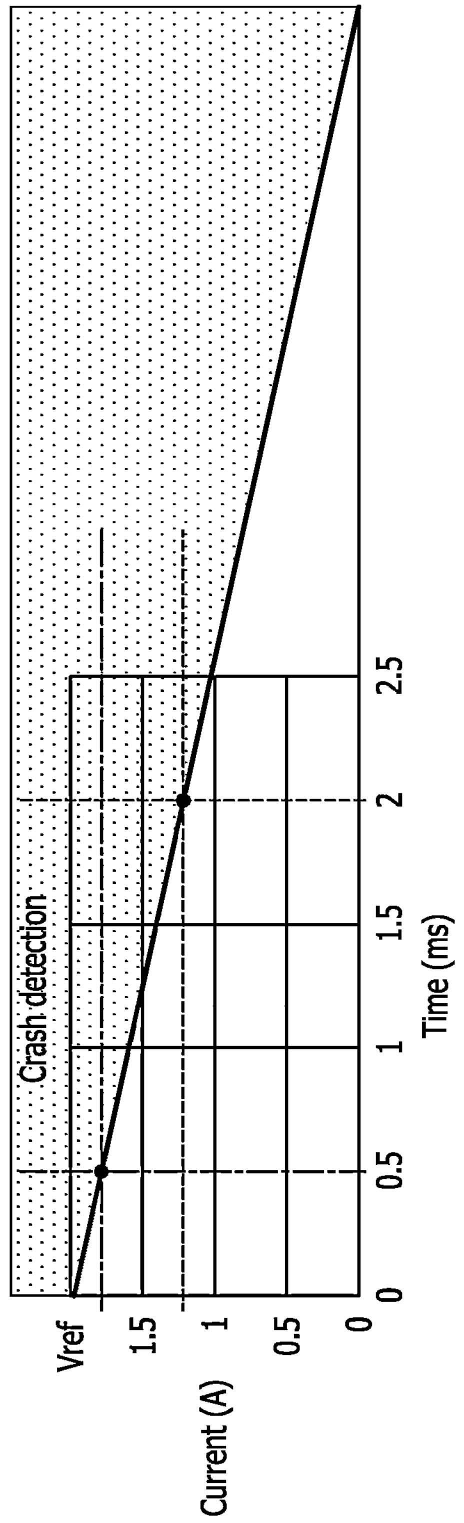
FIG. 2A-2B are exemplary diagrams for describing a method in which a BMU detects a crash signal received from a vehicle.
Figure 2B:
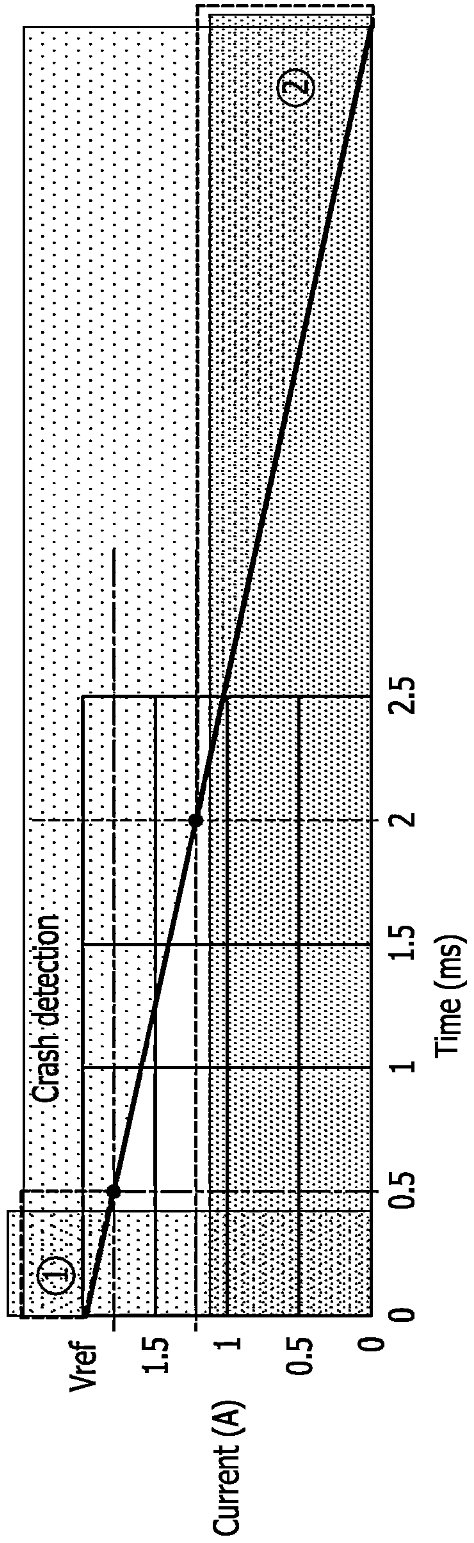

FIGS. 2A-2B are exemplary diagrams for illustrating a method in which a BMU (of, e.g., the related art) detects a crash signal received from a vehicle. FIG. 2A is an exemplary diagram illustrating a detection area where the BMU detects a crash signal, and FIG. 2B is an exemplary diagram illustrating a reason in which the BMU detects (e.g., incorrectly identifies) an abnormal crash signal as a normal crash signal.

In FIGS. 2A-2B, a reference voltage Vref has a value converted from a current to a voltage level. That is, in FIGS. 2A-2B, the label "Vref" is the current (in amperes) representation of the a reference voltage Vref.

As shown in FIG. 2B, a crash detection circuit of the BMU detects (e.g., incorrectly determines) that a normal crash signal is input even when a crash signal transmitted from a vehicle corresponds to an area (1) (in which a retention time of the crash signal is, for example, smaller than 0.5 ms and a value of the crash signal is greater than that of the reference voltage Vref) or corresponds to an area (2) (in which the value of the crash signal is, for example, smaller than 1.2 A and the retention time of the crash signal is greater than 2 ms) so that there is a problem in that the crash detection circuit may perform an unintended and an unnecessary shock response operation.

This is because the crash detection circuit of the BMU of the related art may not exclude an abnormal crash signal (e.g., an abnormal crash signal caused by aging or failure of the vehicle or vehicle components). That is, this is because the crash detection circuit of the BMU detects an input of the crash signal without taking into consideration of both the retention time threshold value and the crash current threshold value for the crash signal.

Figure 3:
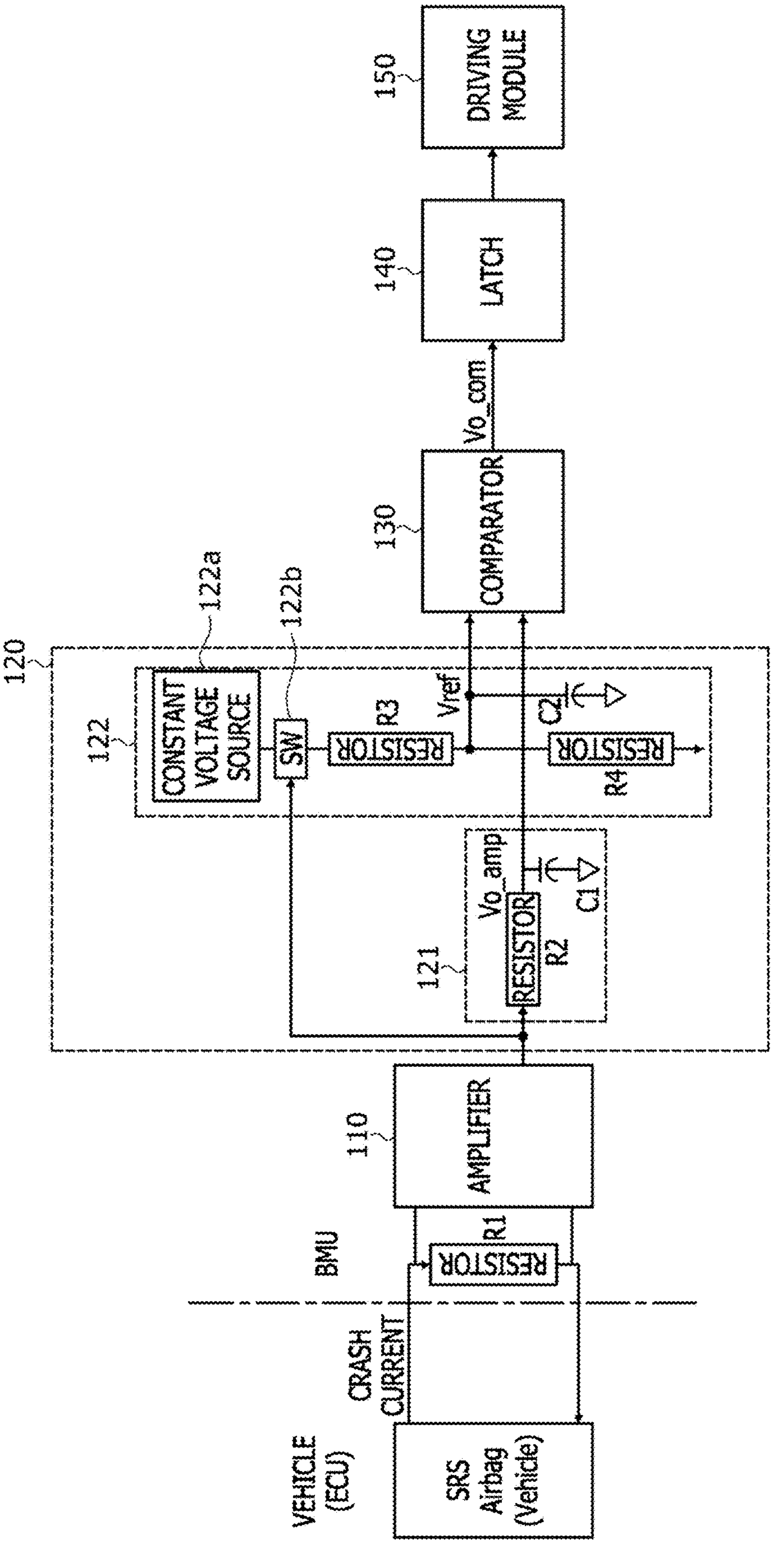
FIG. 3 is a schematic block diagram illustrating a crash detection circuit of a BMU according to some embodiments of the present disclosure.

FIG. 3 is a schematic block diagram illustrating a crash detection circuit of a BMU according to some embodiments of the present disclosure.

Referring to FIG. 3, the crash detection circuit of a BMU according to the some embodiments includes an amplifier 110, a reference voltage generator 120, a comparator 130, a latch 140, and a driving module 150.

In some embodiments, the amplifier (e.g., one including an operational amplifier) 110 outputs an amplified crash signal Vo_amp obtained by amplifying the crash signal input from the vehicle (that is, by amplifying a voltage detected at both ends of (e.g., across) a resistor R1 through which a crash current output from the vehicle flows) with a set gain.

When the crash signal is amplified through the amplifier 110, the reference voltage generator 120 generates and outputs a reference voltage Vref (which may gradually decrease over time) to the comparator 130 together with the amplified crash signal Vo_amp output from the amplifier 110.

The reference voltage generator 120 includes a low-pass filter circuit 121 (e.g., an RC filter circuit including a resistor R2 and capacitor C1) configured to filter the amplified crash signal Vo_amp output from the amplifier 110 and to generate a processed crash signal.

The reference voltage generator 120 includes a reference voltage generation circuit 122, which generates and outputs the reference voltage Vref when the amplified crash signal Vo_amp is output from the amplifier 110.

The reference voltage generation circuit 122 includes a constant voltage source 122*a*, a switch (e.g., a transistor) 122*b* having one side connected to the constant voltage source 122*a* and the other side connected to a plurality of resistors R3 and R4 connected in series, and a capacitor C2 having one side connected to a common connection point of the plurality of resistors R3 and R4 and another side that is grounded (e.g., is connected to a ground reference).

The reference voltage generation circuit 122 switches the switch 122*b* off in response to the amplified crash signal Vo_amp output from the amplifier 110, blocks a current output from the constant voltage source 122*a* as the switch 122*b* is switched off, and discharges a voltage charged in the capacitor C2 through the fourth resistor R4. Thus, the reference voltage Vref is output from the common connection point of the plurality of resistors R3 and R4, and a value of the reference voltage Vref gradually decreases over time.

This has the characteristics of solving the disadvantage of related art of not being able to detect the characteristics of the retention time of the crash signal, which is inversely proportional to the value of the crash signal, when the reference voltage Vref is maintained at a constant voltage.

The comparator 130 compares the reference voltage Vref generated and output from the reference voltage generator 120 with the amplified crash signal Vo_amp output through the amplifier 110, the output of the comparator 130 is activated when the amplified crash signal Vo_amp becomes the reference voltage Vref or more, and outputs a crash detection signal Vo_com.

The latch 140 latches the crash detection signal Vo_com output from the comparator 130.

The driving module 150 is driven according to the crash detection signal Vo_com output from the latch 140 to block an output (e.g., to block the discharge or output current) of the battery (e.g., turn the relay or actuator off to block the output of the battery).

Figure 4:
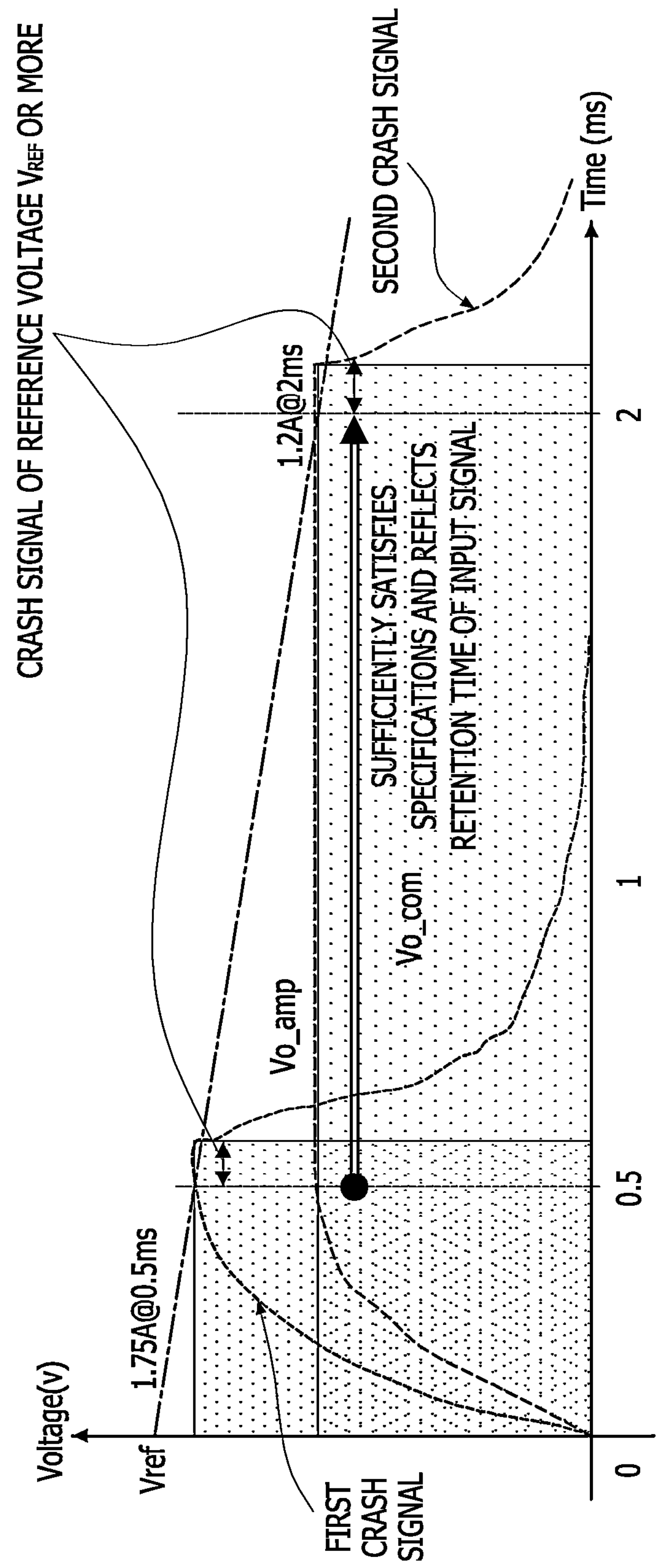
FIG. 4 is an exemplary diagram illustrating a relationship between times and voltage levels of the signal output from components of the crash detection circuit of FIG. 3, according to some embodiments of the present disclosure.

FIG. 4 is an exemplary diagram illustrating a relationship between times and voltage levels of the signal output from components of the crash detection circuit of FIG. 3, according to some embodiments of the present disclosure.

Referring to FIG. 4, it is assumed that one of two types of crash signals (e.g., a first crash signal and a second crash signal) is input from the vehicle to the crash detection circuit of the BMU.

For convenience of description, the first crash signal (e.g., a pulsed crash signal at about 1.75 A and a duration of about 0.5 ms) and the second crash signal (e.g., a pulsed crash signal at about 1.2 A and a duration of 2 ms) are displayed in separate hatched areas, and both the first and second crash signals are each assumed as the processed crash signal Vo_amp after passing through the amplifier 110 and the low-pass filter circuit 121.

At this time, when a portion of the first crash signal that is greater than the reference voltage Vref (i.e., the reference voltage Vref which gradually decreases over time as shown by the dashed line in FIG. 4) occurs after about 0.5 ms (e.g., as measured from the start of the signal), and a portion of the second crash signal that is greater than the reference voltage Vref (i.e., the reference voltage Vref which gradually decreases over time) occurs after about 2 ms (e.g., as measured from the start of the signal), because the first crash signal and the second crash signal sufficiently satisfy the retention time specifications of the crash signal described with reference to FIG. 1, the output of the comparator 130 is activated and thus the crash detection signal Vo_com is output.

Figure 5:
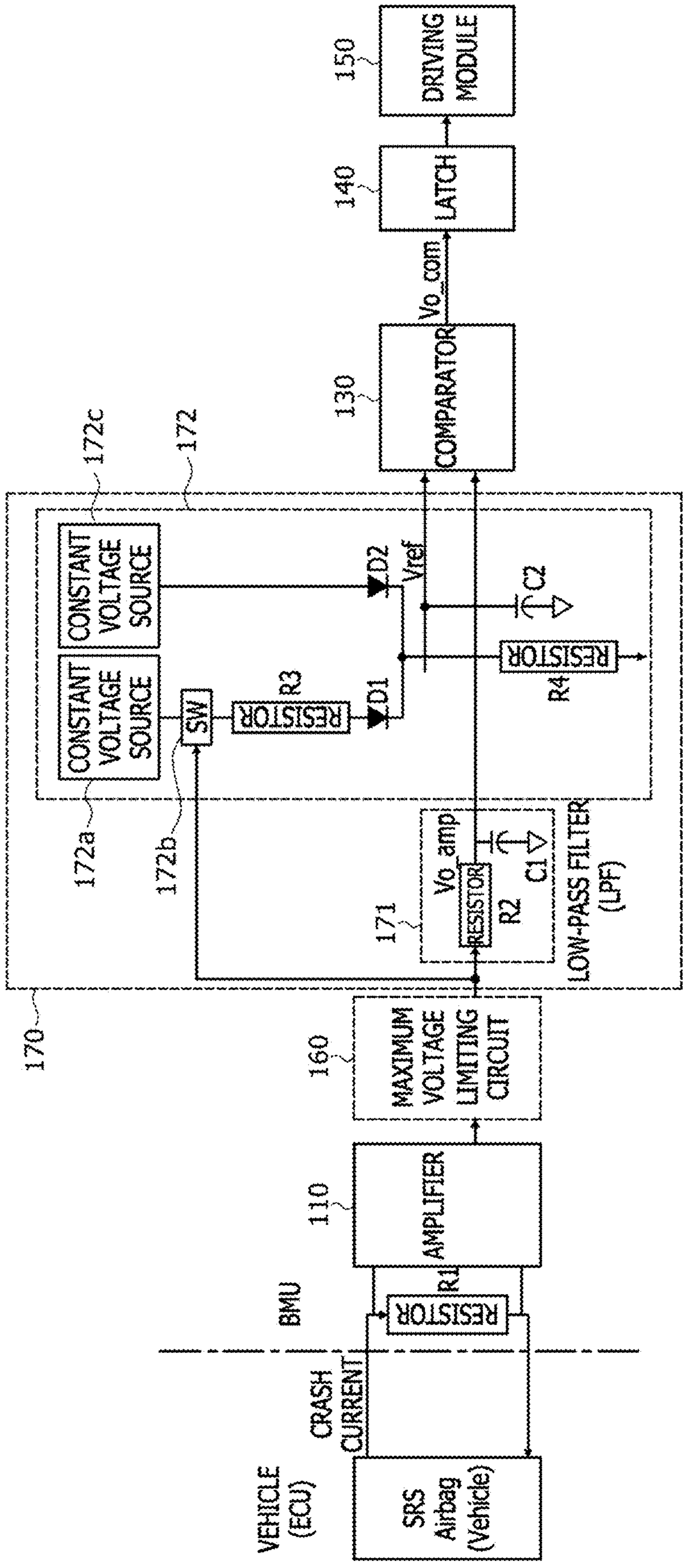
FIG. 5 is a schematic block diagram illustrating a crash detection circuit of a BMU according to some other embodiments of the present disclosure.

FIG. 5 is a schematic block diagram illustrating a crash detection circuit of a BMU according to some other embodiments of the present disclosure.

Referring to FIG. 5, the crash detection circuit of a BMU according to some embodiments includes an amplifier 110, a reference voltage generator 170, a comparator 130, a latch 140, a driving module 150, and a maximum voltage limiting circuit 160.

When compared with the crash detection circuit of a BMU according to the embodiments of FIG. 3, the crash detection circuit of a BMU according to the embodiments of FIG. 5 has a difference in the configuration of a reference voltage generator 170 and also has a difference in that the crash detection circuit further includes the maximum voltage limiting circuit 160.

Therefore, for convenience of description, the description of the duplicate components 110, 130, 140, and 150 may not be repeated, and description hereinafter may primarily focus on the reference voltage generator 170 and the maximum voltage limiting circuit 160.

Referring to FIG. 5, when an amplified crash signal is output through the amplifier 110, the reference voltage generator 170 generates and outputs a reference voltage Vref to the comparator 130 together with the amplified crash signal Vo_amp output from the amplifier 110.

The reference voltage generator 170 includes a low-pass filter circuit 171 configured to filter the amplified crash signal Vo_amp output from the amplifier 110 and to generate a processed crash signal.

The reference voltage generator 170 includes a reference voltage generation circuit 172, which generates and outputs a reference voltage Vref when the amplified crash signal Vo_amp is output from the amplifier 110 or the processed crash signal is output from the low-pass filter circuit 171.

The reference voltage generation circuit 172 includes a first constant voltage source 172*a*, a second constant voltage source 172*c*, a switch 172*b* having one side connected to the first constant voltage source 172*a* and the other side connected to one side of a third resistor R3, a first diode D1 having an anode connected to the other side of the third resistor R3 and a cathode connected to one side of a fourth resistor R4, a second diode D2 having an anode connected to the second constant voltage source 172*c* and a cathode connected to the one side of the fourth resistor R4, and a capacitor C2 having one side connected to a common connection point of the first and second diodes D1 and D2 and the fourth resistor R4 and having another side that is grounded.

The maximum voltage limiting circuit 160 is a circuit for limiting a maximum voltage of an output of the amplifier 110 to a set or predetermined voltage (e.g., an upper limit voltage). The maximum voltage limiting circuit 160 sets an output voltage of the amplifier 110 to a voltage Vo_amp_max that operates at a minimum retention time of the crash signal, and prevents the comparator from operating regardless of a value of the crash signal input (e.g., received) before the minimum retention time.

The maximum voltage limiting circuit 160 may be configured as a separate circuit or implemented using a function for limiting the output voltage of the amplifier 110 itself.

The reference voltage generation circuit 172 switches the switch 172*b* off in response to the amplified crash signal Vo_amp output from the amplifier 110, blocks a current output from the first constant voltage source 122*a* as the switch 172*b* is switched off, and discharges a voltage charged in the capacitor C2 through a plurality of third resistors R3. Thus, the reference voltage Vref is output from the common connection point of the first and second diodes D1 and D2 and the fourth resistor R4, and a value of the reference voltage Vref gradually decreases over time.

The reference voltage generation circuit 172 connects the first constant voltage source 172*a* and the second constant voltage source 172*c* in parallel by the first and second diodes D1 and D2. The first constant voltage source 172*a* supplies a maximum reference voltage value Vref_max at which the reference voltage Vref starts to be discharged after the crash signal is input, and the second constant voltage source 172*c* is set to a voltage that operates at the maximum retention time of the crash signal. Thus, when the discharging of the reference voltage Vref is terminated, a minimum reference voltage value Vref_min is maintained.

Figure 6:
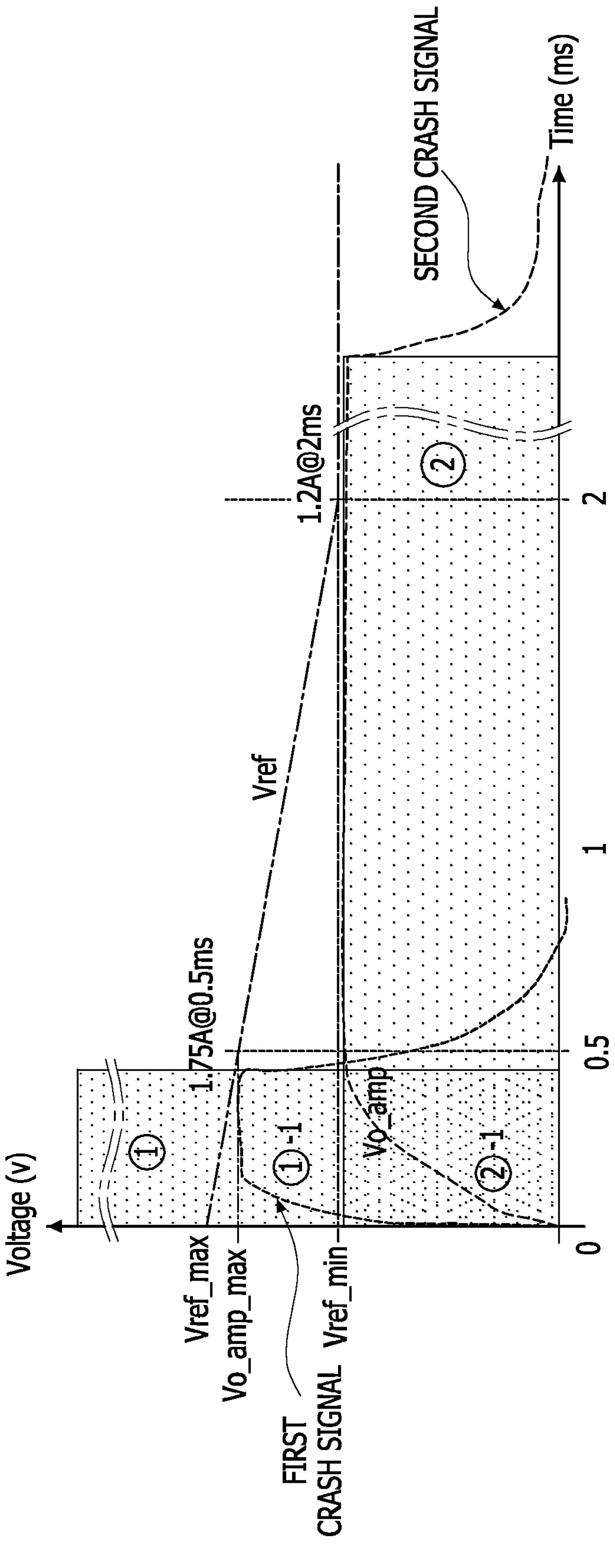
FIG. 6 is an exemplary diagram illustrating a relationship between times and voltage levels of the signal output from components of the crash detection circuit of FIG. 5, according to some embodiments of the present disclosure.
Figure 7:
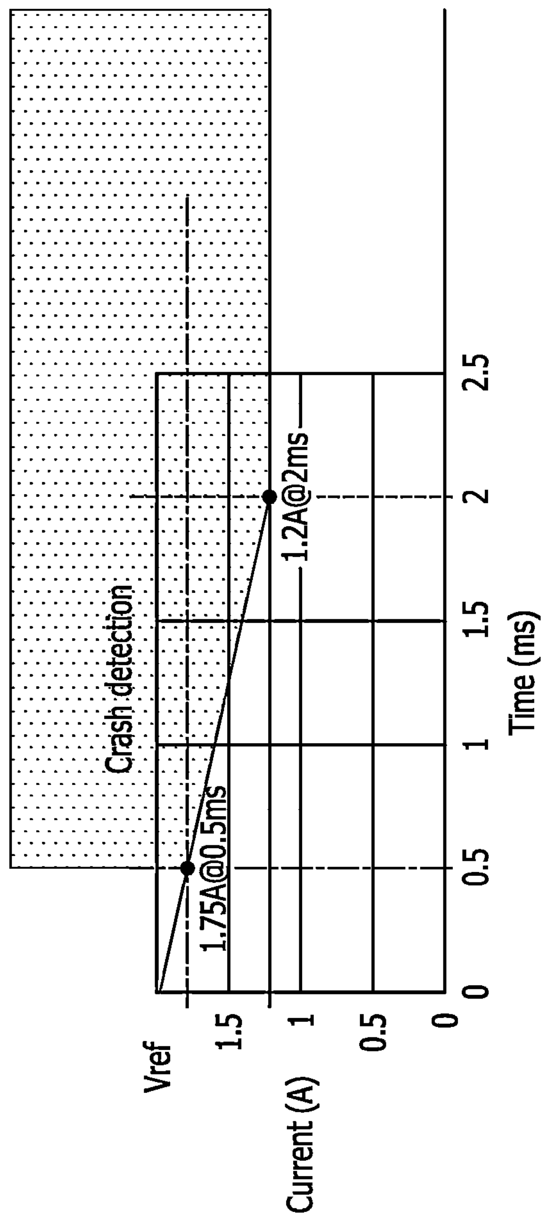
FIG. 7 is an exemplary diagram illustrating a characteristic graph of a crash detection area of the crash detection circuit of a BMU, according to some embodiments of the present disclosure.

FIG. 6 is an exemplary diagram illustrating a relationship between times and voltage levels of the signal output from components of the crash detection circuit of FIG. 5, according to some embodiments of the present disclosure. FIG. 7 is an exemplary diagram illustrating a characteristic graph of a crash detection area of the crash detection circuit of a BMU according to some embodiments of the present disclosure.

Referring to FIG. 6, it is assumed that one of two types of crash signals (e.g., a first crash signal and a second crash signal) is input from the vehicle to the crash detection circuit of the BMU.

For convenience of description, an original first crash signal (e.g., a pulsed crash signal at about 10 A and a duration of about 0.4 ms) before a voltage level of the crash signal is limited is displayed by a first hatched area 1 (i.e., an area including a voltage cut-off portion), and the second crash signal (e.g., a pulsed crash signal at about 1.15 A and a duration of about 100 ms) is displayed by a second hatched area (2) (i.e., an area including a retention time cut-off portion).

Here, when the first crash signal is input, a voltage level of the crash signal output, after an output of the amplifier 110 passes through the maximum voltage limiting circuit 160, is limited to the maximum output voltage threshold value Vo_amp_max shown by a dotted line ①-1. In this case, because the maximum output voltage threshold value Vo_amp_max is smaller than the reference voltage Vref when not satisfying the minimum retention time specification (e.g., about 0.5 ms), a crash signal with a retention time that is smaller than the minimum retention time specification cannot activate the comparator 130 regardless of its value, and therefore the crash signal is not detected.

When the second crash signal is input, the reference voltage of the comparator 130 does not fall to the minimum reference voltage threshold value Vref_min or less with the second constant voltage source 172*c*, and a voltage level of the crash signal output after passing through the amplifier 110 and the maximum voltage limiting circuit 160 cannot be higher than the minimum reference voltage threshold value Vref_min shown by a dotted line ②-1. Thus, a crash signal with a voltage value that is smaller than the minimum voltage specification cannot activate the comparator 130 regardless of a value of its retention time and the crash signal is not detected.

In this way, the crash detection circuit of a BMU according to the present embodiment has the characteristics of the crash detection area as shown in FIG. 7, thus perfectly satisfying the specifications of the crash signal output from the vehicle described with reference to FIG. 1.

As described above, according to some embodiments of the present disclosure, an abnormal crash signal transmitted from the vehicle to the BMU is excluded (e.g., ignored and not reacted to with a crash response) and a crash response operation may be performed only for a normal crash signal. In addition, according to some embodiments of the present disclosure, the crash response operation may be performed only for the crash signal exceeding a preset retention time threshold value and a crash current threshold value so that the abnormal crash signal transmitted from the vehicle to the BMU may be excluded (e.g., ignored and not reacted to with a crash response).

In accordance with some embodiments of the present disclosure, an abnormal crash signal transmitted from a vehicle to a battery management unit (BMU) can be excluded (e.g., ignored and not reacted to with a crash response) and a crash response operation can be performed only for a normal crash signal.

In addition, in accordance with some embodiments of the present disclosure, the crash response operation can be performed only for the crash signal exceeding a preset retention time threshold value and a crash current threshold value so that the abnormal crash signal transmitted from the vehicle to the BMU can be excluded.

However, effects that can be achieved through the present disclosure are not limited to the above-described effects and other effects that are not described may be clearly understood by those skilled in the art from the detailed descriptions.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A crash detection circuit of a battery management unit (BMU), comprising:

a reference voltage generator configured to generate a reference voltage in response to a crash signal output from a vehicle being input to the BMU; and a comparator configured to compare the reference voltage generated from the reference voltage generator with a processed crashed signal corresponding to the crash signal and to output a crash detection signal in response to the processed crash signal having a duration greater than or equal to a minimum retention time and at a voltage greater than or equal to the reference voltage, wherein the reference voltage generator comprises a reference voltage generation circuit comprising:

a constant voltage source;

a plurality of resistors connected in series;

a switch connected between, and in series with, the constant voltage source and the plurality of resistors, and configured to activate in response to the crash signal being output, and wherein the reference voltage is output from a common connection point of the plurality of resistors.

2. The crash detection circuit of claim 1, wherein the processed crash signal compared with the reference voltage by the comparator corresponds to the crash signal, which is amplified through an amplifier.

3. The crash detection circuit of claim 1, further comprising:

an amplifier configured to amplify the crash signal with a set gain by receiving the crash signal from the vehicle and generating an amplified crash signal to the reference voltage generator, wherein the processed crash signal corresponds to the amplified crash signal.

4. The crash detection circuit of claim 3, wherein the reference voltage generation circuit is configured to generate and output the reference voltage in response to the amplified crash signal being output.

5. The crash detection circuit of claim 4, wherein the reference voltage generation circuit further comprises:

a capacitor having one side connected to a common connection point of the plurality of resistors and another side that is grounded.

6. The crash detection circuit of claim 4, wherein the reference voltage generator further comprises a low-pass filter circuit configured to filter the amplified crash signal and to generate and output the processed crash signal.

7. The crash detection circuit of claim 1, further comprising:

a latch configured to latch the crash detection signal output from the comparator, wherein a driving module configured to block an output of a battery is operated by the latched crash detection signal.

8. A crash detection circuit of a battery management unit (BMU), comprising:

a reference voltage generator configured to generate a reference voltage in response to a crash signal output from a vehicle being input to the BMU;

a maximum voltage limiting circuit configured to limit a maximum voltage of the crash signal output from the vehicle to a set voltage and to generate a capped crash signal; and a comparator configured to compare the reference voltage generated by the reference voltage generator with the capped crash signal output by the maximum voltage limiting circuit, and to output a crash detection signal in response to the capped crash signal having a duration greater than or equal to a minimum retention time and a voltage greater than or equal to the reference voltage, wherein the reference voltage generator comprises a reference voltage generation circuit comprising:

a first constant voltage source;

a third resistor and a fourth resistor connected in series;

a switch connected between, and in series with, the first constant voltage source and the third and fourth resistors, and configured to activate in response to the capped crash signal being output, and wherein the reference voltage is output from a common connection point of the third and fourth resistors.

9. The crash detection circuit of claim 8, wherein a signal input to the maximum voltage limiting circuit corresponds to the crash signal, which is amplified through an amplifier.

10. The crash detection circuit of claim 9, wherein the amplifier is configured to generate an amplified crash signal by amplifying the crash signal received from the vehicle with a set gain, and to output the amplified crash signal to the reference voltage generator.

11. The crash detection circuit of claim 8, wherein the reference voltage generation circuit is configured to generate and output the reference voltage in response to the capped crash signal being output from the maximum voltage limiting circuit.

12. The crash detection circuit of claim 11, wherein the switch has one side connected to the first constant voltage source and another side connected to one side of the third resistor, and wherein the reference voltage generation circuit further comprises:

a second constant voltage source;

a first diode having an anode connected to an other side of the third resistor and a cathode connected to one side of the fourth resistor;

a second diode having an anode connected to the second constant voltage source and a cathode connected to the one side of the fourth resistor; and a capacitor having one side connected to a common connection point of the first and second diodes and the fourth resistor and having another side that is grounded, wherein the reference voltage is output from the common connection point of the first and second diodes and the fourth resistor.

13. The crash detection circuit of claim 11, wherein the reference voltage generator further comprises a low-pass filter circuit configured to filter and output the capped crash signal output from the maximum voltage limiting circuit.

14. The crash detection circuit of claim 8, further comprising:

a latch configured to latch the crash detection signal output from the comparator, wherein a driving module configured to block an output of a battery is operated by the latched crash detection signal.

* * * * *